Jan. 30, 1962  L. R. VERSCHOYLE  3,018,950
PROGRAMMING CALCULATOR

Filed July 25, 1958

INVENTOR
L. R. VERSCHOYLE
BY
Ralph L. Wugger
ATTORNEY

Jan. 30, 1962  L. R. VERSCHOYLE  3,018,950
PROGRAMMING CALCULATOR
Filed July 25, 1958  7 Sheets-Sheet 4
FIG. 4
FIG. 16
FIG. 15
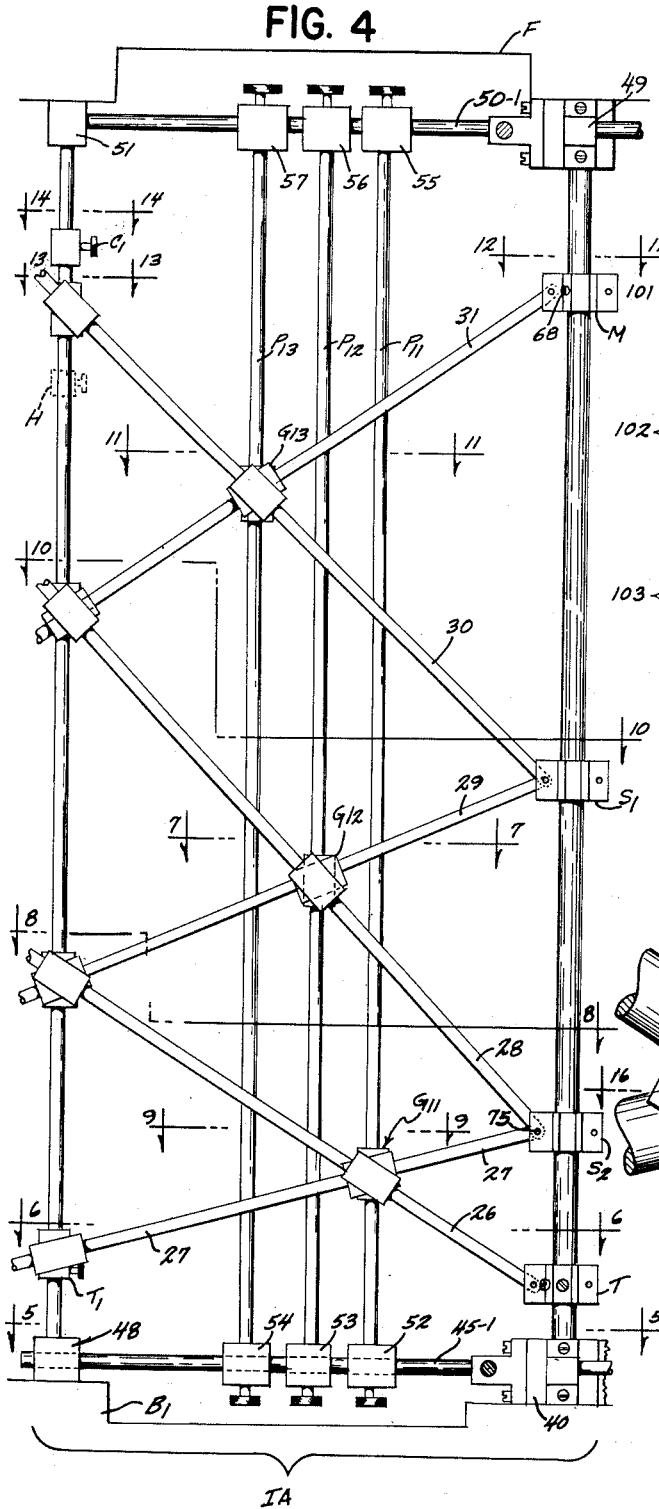
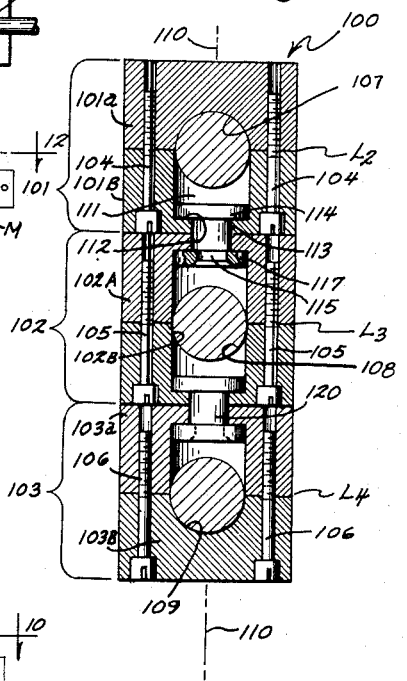
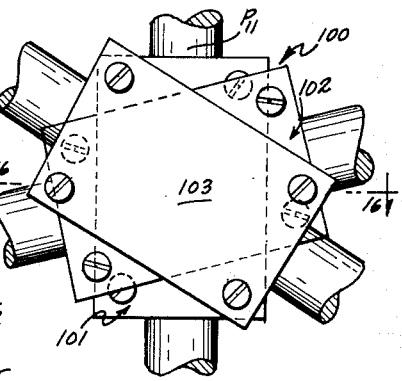
INVENTOR
L. R. VERSCHOYLE
BY
Ralph L. Dugger
ATTORNEY

United States Patent Office 3,018,950
Patented Jan. 30, 1962

3,018,950
PROGRAMMING CALCULATOR
L. R. Verschoyle, Minneapolis, Minn., assignor to International Milling Company, Minneapolis, Minn., a corporation of Delaware
Filed July 25, 1958, Ser. No. 750,953
9 Claims. (Cl. 235—61)

The present invention relates to mechanical analogue computers designed to solve complex mathematical problems in a minimum time and with minimum possibility of error. More specifically the invention relates to, and it is an object of the invention to provide, mechanical systems capable of automatically solving standard problems of linear programming, wherein the problems may be expressed as follows:

Find values of $x_1, x_2 \ldots x_n$ so that (1) $$\sum_{j=1}^{n} A_{ij}x_j \geq B_i, \, i=1, 2 \ldots m$$

and so that (2) $$\sum_{j=1}^{n} D_j x_j$$

is extremalized (minimized or maximized).

In expressions (1) and (2):

$n$ = a selected number of variables
$A_{ij}$ = a number associated with the $j$th variable as it occurs in the $i$th inequality
$x_j$ = the $j$th of the $n$ variables which appear in the program
$\geq$ means greater than or equal
$B_i$ = a number which is associated with the $i$th inequality
$i=1, 2 \ldots m$ means that there are $m$ such inequalities and these can be found by letting $i$ take on the value 1; then 2, 3, and so up to $m$
$D_j$ is a number associated with the $j$th variable as it occurs in the expression which represents the quantity to be extremalized.

In the foregoing expressions the term "extremalized" is intended to mean either minimized or maximized.

It is an object of the invention to provide mechanical systems capable of solving the aforesaid type problems.

Other and further objects are those inherent in the apparatus illustrated, described and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings, wherein

Figure 1:
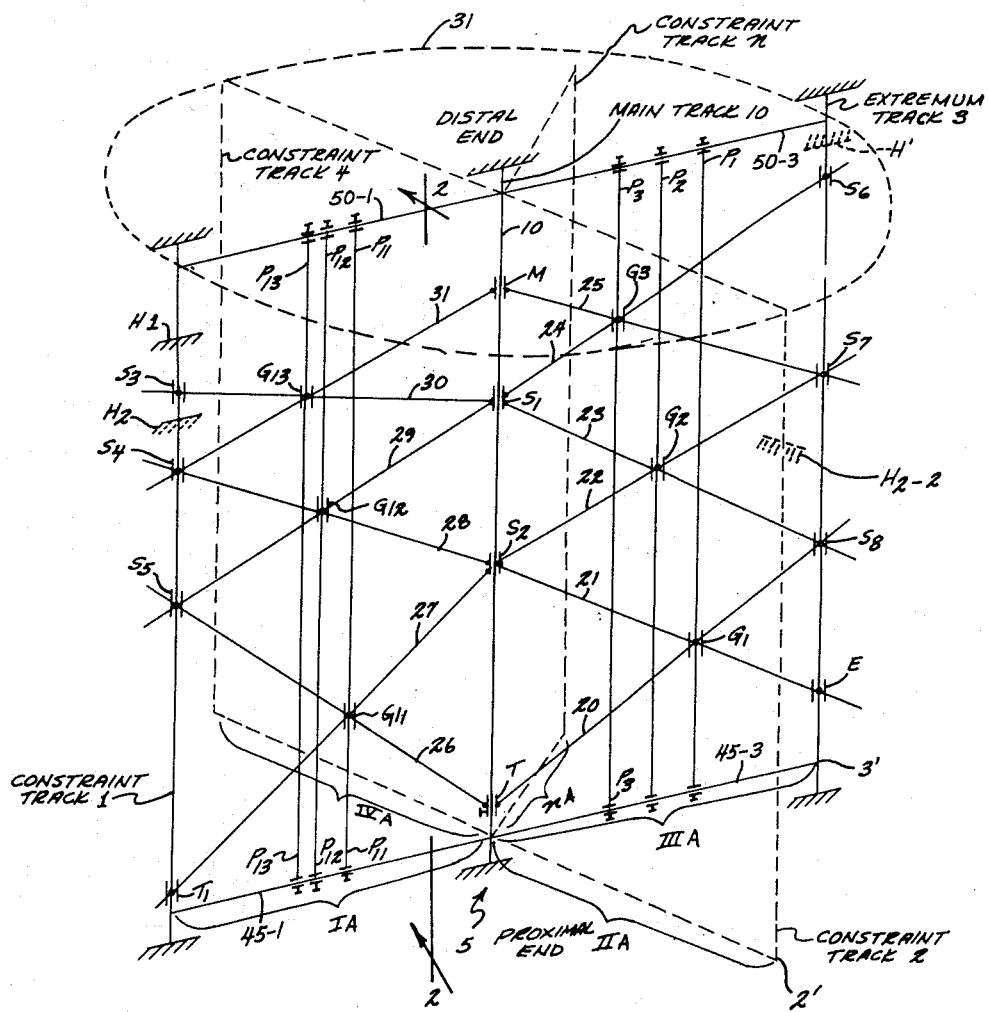
FIGURE 1 is a schematic isometric view of one illustrative embodiment of a machine made according to my invention.
Figure 2:
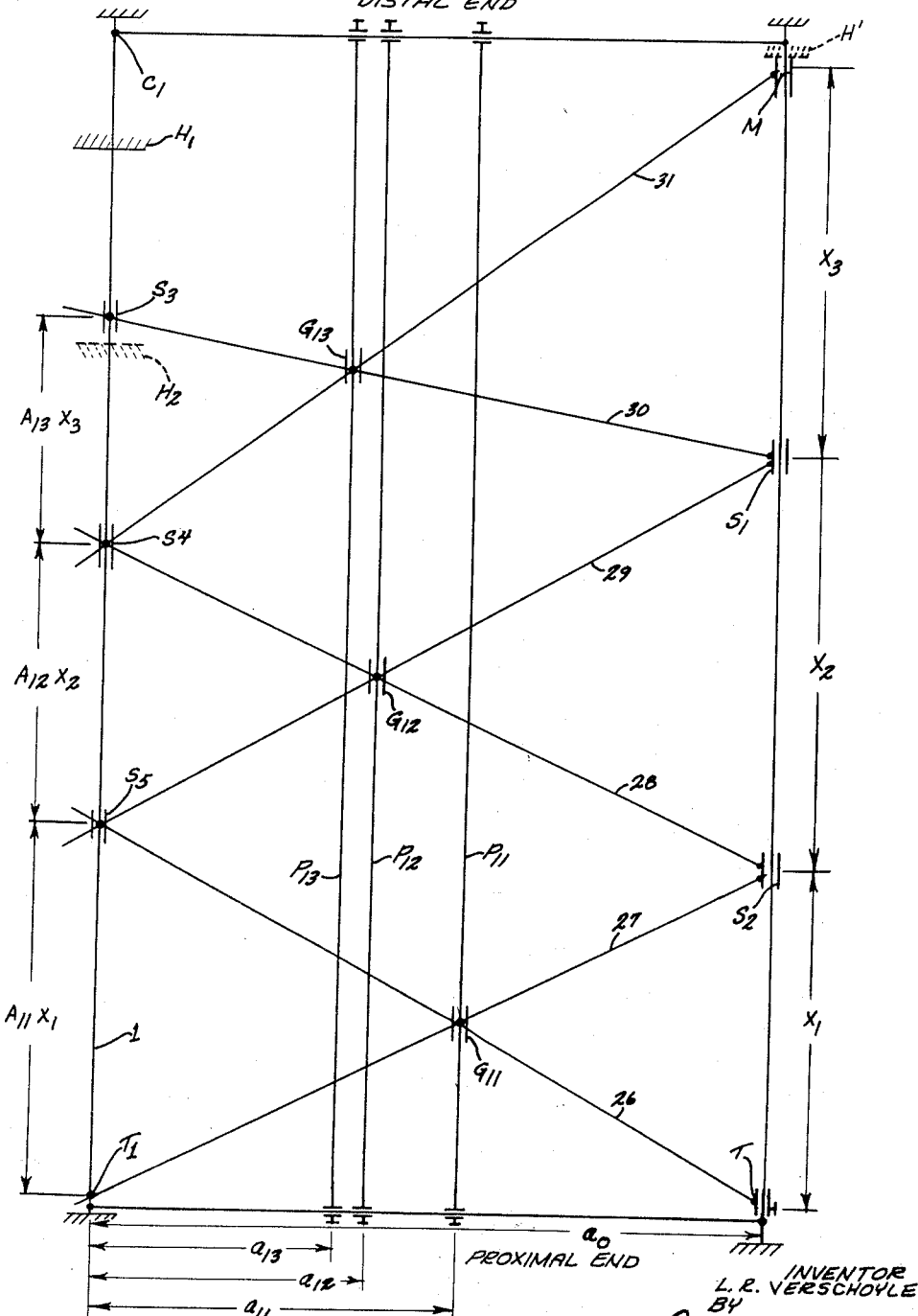
FIGURE 2 is a schematic side elevational view of a Constraint Track Number 1 of FIGURE 1, FIGURE 2 being thus a fragmentary vertical elevational view taken in the direction of arrows 2—2 of FIGURE 1.
Figure 3:
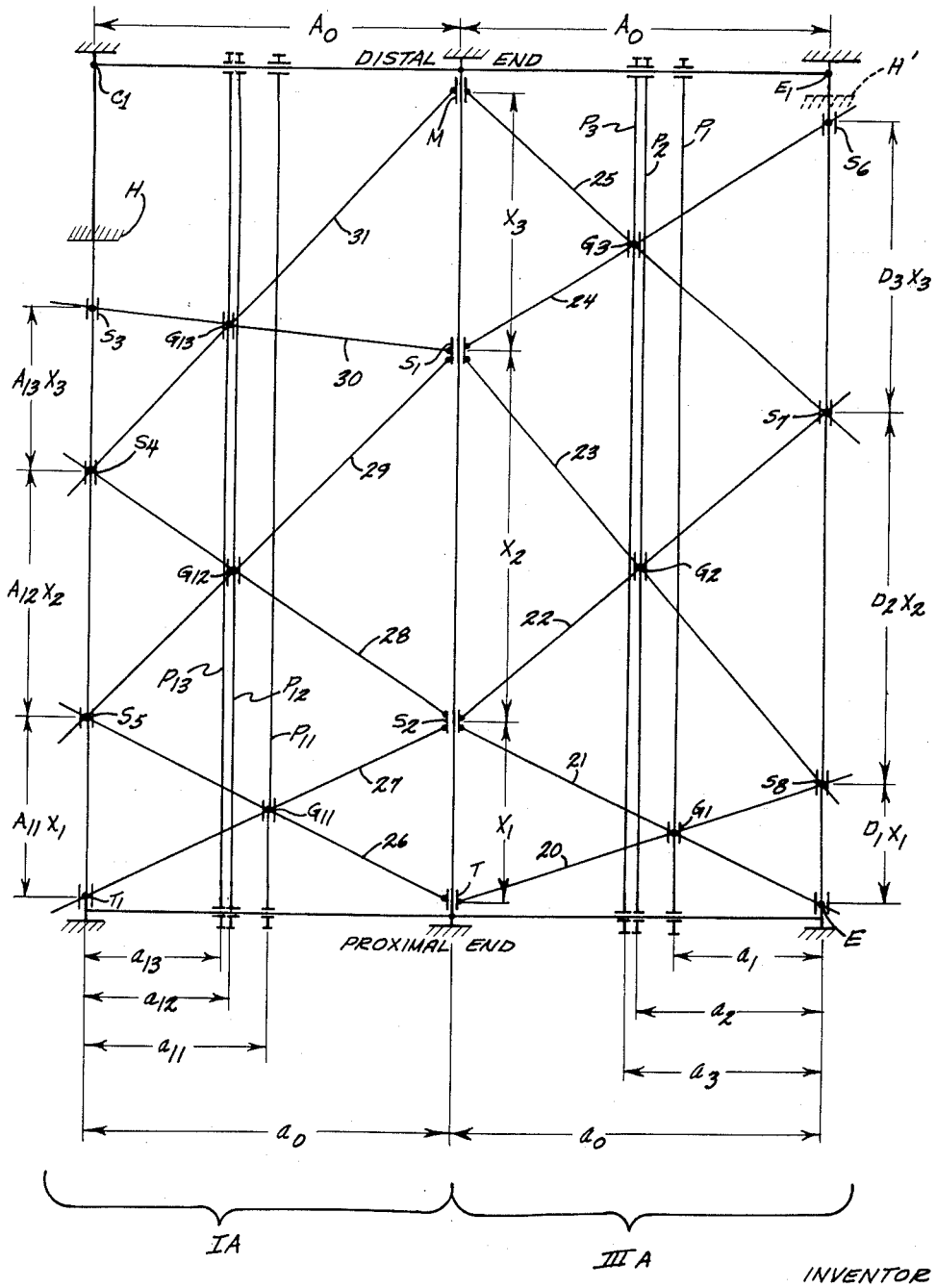
Figure 16:
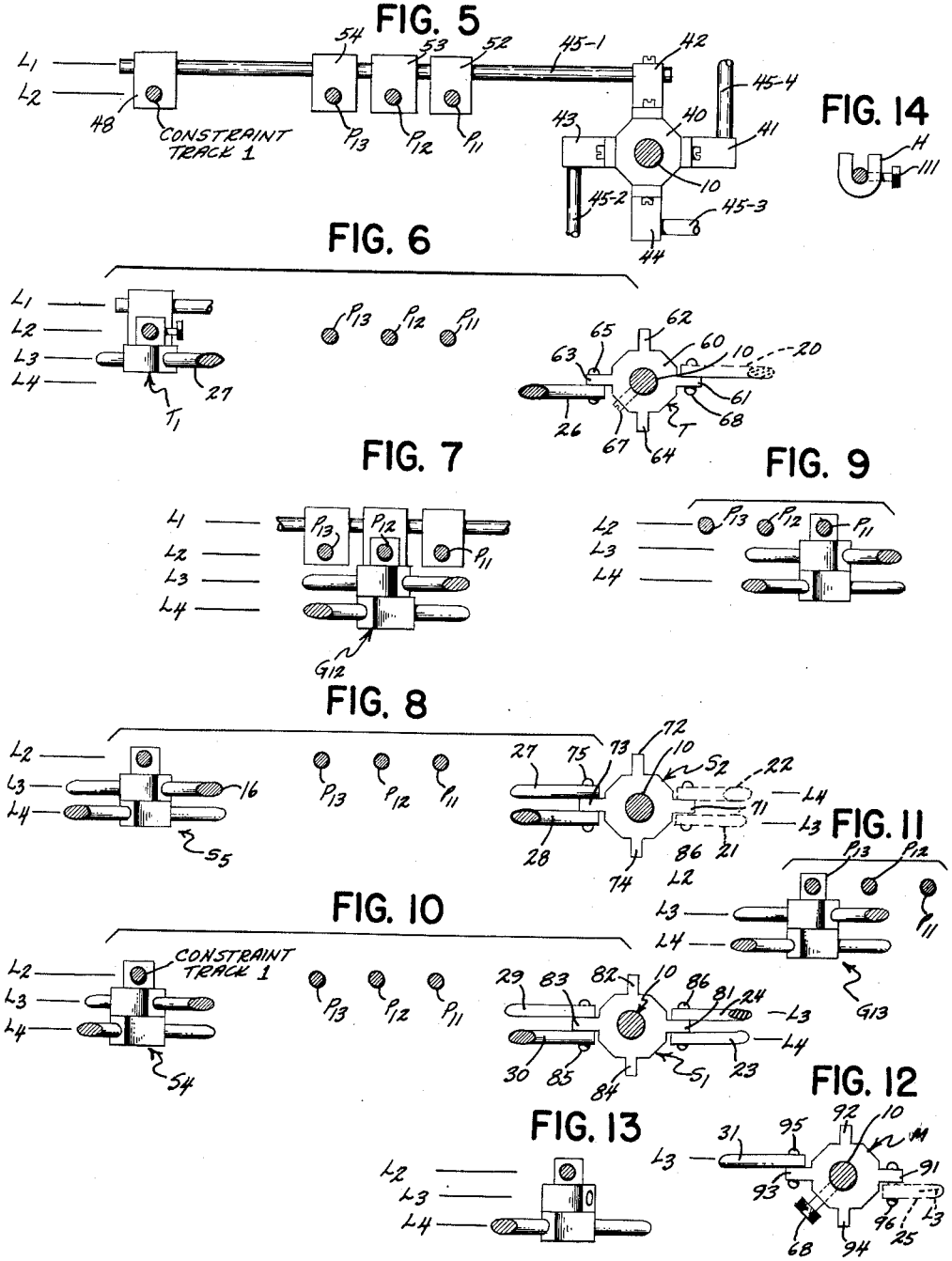
Figure 17:
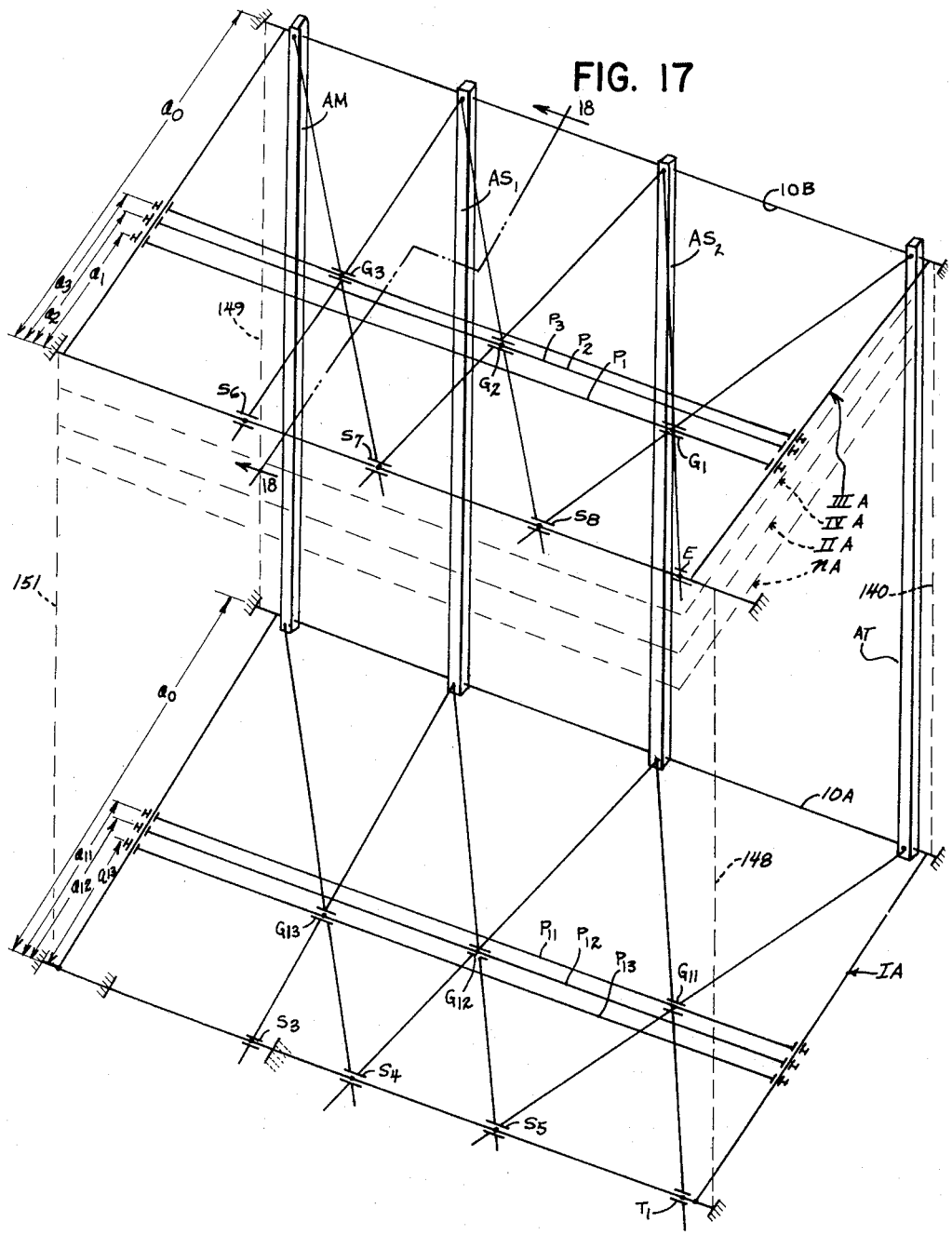
Figure 18:
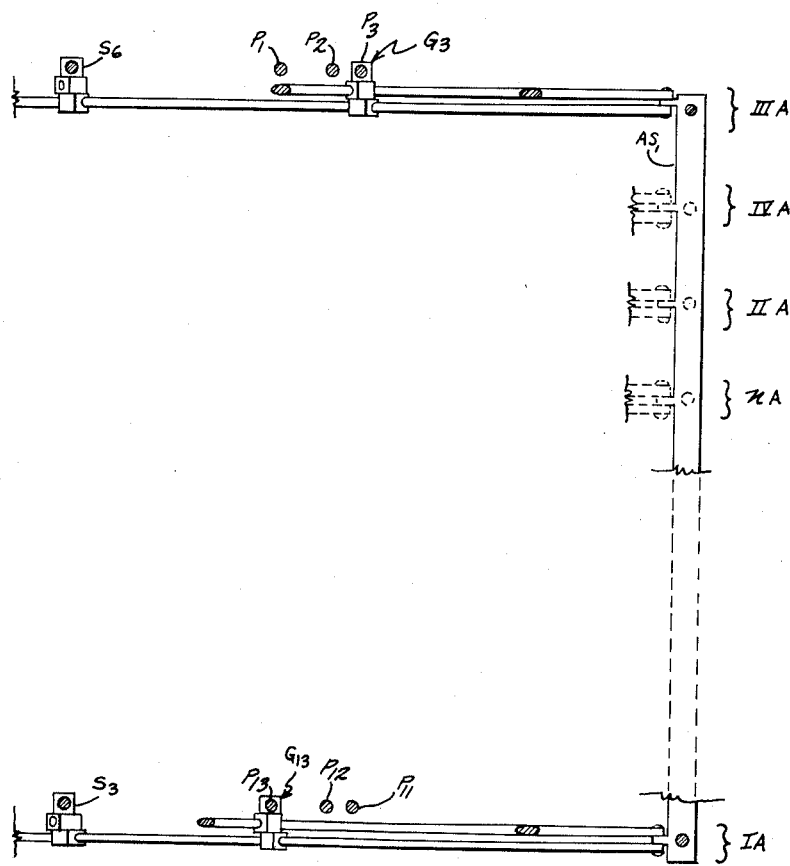

FIGURE 3 is a schematic side elevational view of the Constraint Track Number 1 and the Extremum Track No. 3 of FIGURE 1, these tracks being co-planar, this view being therefore a vertical sectional view taken normal to the common plane of these tracks. In FIGURE 3 the adjustment of the various elements does not correspond precisely to the adjustment of the parts shown in FIGURE 2, this being for illustrative purposes;

FIGURE 4 is a side elevational view, corresponding to FIGURE 2, but showing in greater detail the mechanical structure employed in constructing the mechanism, which is shown schematically in the other figures;

FIGURES 5 through 14 are all horizontal sectional views taken with reference to FIGURE 4, the number of the figure in each instance corresponding to the numbers applied to the arrows, denoting the section which is being illustrated. Thus, FIGURE 5 is a horizontal sectional view taken along the line and in the direction of arrows 5—5 of FIGURE 4, and similarly FIGURE 6 shows the section taken in the direction of arrows 6—6, etc. through FIGURE 14, which denotes the horizontal sectional view taken along the line and in the direction of arrows 14—14, all of these sections being for the device shown in FIGURE 4;

FIGURE 15 is an enlarged partial side-elevational view of one of the slide couplers that is used in the apparatus, and generally designated G11 in FIGURE 4;

FIGURE 16 is a sectional view of the slide coupler shown in FIGURE 15. However, in making this sectional view the various parts of the slide coupler, which are freely rotatable with respect to each other, are all brought into alignment, so as to facilitate the drawing of the section. In the actual apparatus it will be understood that the several portions of the coupler rotate freely, and their positions depend upon the positions of the various rods which they couple together;

FIGURE 17 is a partial schematic isometric view of a modified form of the mechanism made according to my invention;

FIGURE 18 is a sectional view, in elevation, taken along the line and in the direction of arrow 18—18 of FIGURE 17, but showing the mechanical structure which is schematically illustrated in FIGURE 17.

In FIGURES 1–3 there is schematically illustrated one example of a machine for carrying out the principles of the present invention. FIGURES 4 through 16 illustrate with greater particularity the mechanical construction of this machine which is schematically illustrated in FIGURES 1–3. In the machine illustrated in FIGURE 1 there is a main track 10, which in this figure is arbitrarily made vertical and is mechanically supported at its upper and lower ends. It can be a smooth round rod and is positioned centrally at the center of a circle, around which there are positioned a plurality of other tracks, each in the form of a smooth rod, which are mechanically supported at their upper and lower ends so as to be positioned in a circle and parallel to the main track and mounted stationary on a suitable support. These tracks or rods are, in FIGURE 1, designated as Constraint Track 1, Constraint Track 2, Extremum Track 3, Constraint Track "n", and Constraint Track 4. The number of these additional rods or tracks, however designated, is arbitrary and may be chosen as desired. In FIGURE 1 five such tracks are indicated, and more or less may be used if desired. They may (though not necessarily) be arranged at equal angular positions around circle 31.

The Main Track 10, taken with successively the various Constraint and Extremum tracks, constitute a plurality of panels which are indicated over the brackets IA, IIA, IIIA, nA, and IVA. Each of these units is of panel formation, and they are identically constructed. In FIGURE 2 there is schematically illustrated one such panel, namely, Panel IA and in FIGURE 3 there is schematically illustrated the Panels IA and IIIA. In FIGURE 3 the position of adjustment of the various parts is different than that shown in FIGURE 1 or 2, since these positions vary with the problem and hence this figure is for illustrative purposes.

Each of the panels IA through IVA and panel nA, also include what are known as proportionality rods or tracks, these being designated, in FIGURE 3, for the panel IIIA by the lines P1; P2; and P3, and for the panel IA by the lines P11; P12; and P13. These proportionality rods are mounted on a suitable framework, so that their positions along the framework may be adjusted radially inwardly and outwardly relative to the Main Track 10, but the proportionality rods are always parallel to each other and parallel to the main track, and hence also parallel to the Constraint Tracks and Extremum Track.

On the main track there are a plurality of similarly constructed fixtures T, S2, S1, and M. For purposes of nomenclature, fixture T which is near one end of the main track is called the "proximal" fixture, while fixture M at the other end of the main track is called the "distal" fixture whereas fixtures S1 and S2 are called "intermediate" fixtures.

The fixture T is fastened to the Track 10 so that it does not slide on the track. This is done by using a key or pin to hold it on the track. The fixtures S1 and S2 are made so that they can slide freely along the track. The fixture M is made so that it can slide, or optionally its position may be adjustably located along the track by means of a set screw, this being sufficient for holding the fixture M in any particular position when such is desired. The set screws are shown for fixtures T and M in FIGURE 4, but are omitted from FIGURES 1–3, for clarity. Each of the fixtures is provided with a pivot for pivotally supporting rods which swing on the pivots in fittings T, S2, S1 and M, and slide through fittings which are movable along the proportionality tracks, and slide through fittings which move along the Constraint Tracks. Each fitting has a pivot for each panel IA, IIA, IIIA, nA and IVA.

Referring to FIGURES 1 and 3, on the Extremum Track 3, there are provided a proximal slider E, intermediate sliders S8 and S7, and distal slider S6. On the proportionality rods P1, P2, and P3, there are respectively provided other sliders, G1, G2, and G3. These are for the panel IIIA. For the panel IA, on the Constraint Track 1, there are provided proximal slider T1, intermediate sliders S4 and S5, and distal slider S3 and on the proportionality rods P11, P12 and P13 of this unit there are respectively provided sliders G11, G12 and G13. For purposes of nomenclature, the sliders T1 and E are referred to as "proximal" sliders corresponding (in this respect) to proximal fixture T on the main track, and sliders S3 and S6 are called "distal" sliders because they correspond to distal fixture M on the main track. All of the sliders S1 through S8, the sliders E and T1, and the sliders G1 through G3, and G11 through G13, are free to move (unless restrained), on the rods on which they are mounted.

Each slider is constructed to provide a pivot point through which angularly disposed rods which cross the track may slide, thereby actuating the particular slider to and fro on the track rod. Thus for Panel IIIA, for example, there is provided a rod 20 which is pivoted to the fitting T on the Track 10 so that the rod 20 is free to swing within a plane parallel to the plane of panel IIIA. Now fitting T is fixed (it does not slide on rod 10), and rod 20 is pivoted on it and extends out through an eye which is fastened to the slider G1 on the proportionality track P1 and thence extends out through another eye in the slider S8 which is mounted on the Extremum Track 3 and then outwardly beyond, so as to provide excess rod so that regardless of the position of slider S8, the rod 20 will always slide through it. Similarly, to the slider S2 on the Main Track 10 there is pivotally attached a rod 21 for panel IIIA which is likewise free to pivot in a plane parallel to the plane of the Unit IIIA slightly offset from the plane of rod 20. The rod 21 extends downwardly from the slider S2, as shown in FIGURE 1, and thence passes through another eye on the slider G1 and thence through an eye in the slider E on the Track 3. Upon slider S2 there is also pivoted for movement in the plane of rod 20 of unit IIIA, another rod 22 which passes through an eye on the slider G2 on proportionality track P2, and thence the rod 22 continues on and passes through another eye in the slider S7 on the Extremum Track 3 and again beyond so as to provide enough rod so that regardless of the position of slider S7, rod 22 will always be through it. To the slider S1 on the Main Track 10 there are pivotally attached two additional rods 23 and 24, each of which is pivoted for movement in a plane parallel to the plane of unit IIIA. The rod 23 is in the same plane as rod 21 and passes through an eye on the slider G2 on proportionality track P2 and thence through another eye in the slider S8 on the Extremum Track 3 and thence beyond. Similarly rod 24 which is in the plane of rods 20 and 22 extends through an eye on slider G3 on proportionality track P3 and thence out through an eye in the slider S6 on the Extremum Track 3 and beyond. To the slider M on the Track 10 there is pivotally attached a rod 25 which is free to move in the plane of rods 21 and 23 parallel to the plane of the panel IIIA, and this rod 25 passes through an eye in the slider G3 on the proportionality track P3 and thence through an eye in the slider S7 on the Extremum Track 3 and thence beyond.

To accommodate the movement of the various rods 20–25 without interference, and to accommodate the planes of tracks 3 and 10 and of tracks P1, P2, and P3 of panel IIIA, these elements are slightly displaced in four planes L4, L3, L2 and L1, which are in reversed order as compared to FIGURES 5–13, since panel IIIA (FIGURE 1) is viewed "from the rear," as compared to panel IA (FIGURES 4 and 5–13). These location planes are as follows: The upwardly slanting rods, as shown in FIGURE 1, namely rods 20, 22, and 24, are all in a plane of location which is farthest from the viewer corresponding to plane L4, FIGURES 5–13, but from the rear. Next toward the viewer there is another plane of location (plane L3, FIGURES 5–13) for the downwardly slanting rods 21, 23, and 25. Next toward the viewer there is a third plane of location (plane L2, FIGURES 5–13) for Extremum Track 3, and nearest the viewer is a fourth plane of location (plane L1, FIGURES 5–13) for the frame 45–3 and 50–3. These several planes of location, to accommodate the non-interfering movement will best be understood with reference to FIGURE 4 and the sectional views FIGURES 5–16, and will be explained in greater detail hereinafter. This makes up a "panel," in this instance panel IIIA. The other "panels" IA, IIA, nA and IVA are all similar.

Thus, panel IA is constructed in a manner similar to that described for panel IIIA. In this regard it should be remembered that whereas panel IIIA, just described may be considered as "viewed from the rear," panel IA (being diametrically disposed on circle 31), is "viewed from the front." To the fixture T on the Track 10 there is pivotally attached a rod 26 which extend out through an eye in slider G11 on proportionality track P11 and thence out through an eye on slider S5 on Constraint Track 1 and sufficiently beyond so as always to remain in slider 5 regardless of its position on track 1. To the slider S2 on Track 10 there are pivotally attached rods 27 and 28. Rod 27 extends downwardly through an eye on slider G11 on proportionality track P11 and thence through and beyond an eye on slider T1 on Constraint Track 1. Rod 28 extends upwardly from the slider S2 and passes through an eye in slider G12 on proportionality track P12 and thence out through and beyond an eye on slider S4 on Constraint Track 1. To the slider S1 there are similarly pivotally attached rods 29 and 30. Rod 29 extends downwardly through an eye G12 on proportionality track P12 and thence out through and beyond an eye in slider S5 on Constraint Track 1 whereas rod 30 extends upwardly through an eye on slider G13 on proportionality track P13 and thence through and beyond an eye on slider S3 on Constraint Track 1. To the fixture M on Main Track 10, there is pivotally attached rod 31 which extends downwardly through an eye on slider G13 on proportionality track P13 and thence through an eye on and beyond an eye on slider S4 on track 1. All of the rods which slant upwardly, namely rods 26, 28, and 30 are set in a frontmost plane of location, plane L4 as shown in FIGURES 5–13, and they are free to swing in this plane, whereas the rods which slant downwardly, namely the rods 27, 29, and 31, are all arranged in the next plane to the rear, namely plane L3 of FIGURES 5–13. The rods P11, P12, and P13 are arranged in the next plane, namely plane L2 in FIGURES 5–13, and frame rods 45–1 and 50–1 are arranged in the rear plane L1. This arrangement, shown in FIGURES 5–13, accommodates non-interfering movement of the various rods.

The panels IIA, nA and IVA are similarly constructed, all having proportionality tracks like those shown for the panels IA and IIIA, and all have arrangements of angularly disposed rods passing through sliders on the proportionality rods and on the constraint tracks, as described for panels IA and IIIA. In every instance the proportionality tracks are mounted so that they remain parallel, but their positions radially from the main track can be adjusted for solution of particular problems.

Referring now to FIGURES 4–16, at the bottom of Track 10 there is provided a base hub 40, which is preferably made polygonal in shape, so as to provide as many flat surfaces for attachment of pivots as there are radially extending panels.

Note that in the description thus far, as there are for FIGURE 1 for example, there have been mentioned five (5) panels. IA, IIA, IIIA, nA, and IVA. The panel nA is representative of one or several panels, the total number of panels being arbitrary, and may be chosen at will, and the fixtures of the main track 10 are modified accordingly to provide as many mountings (pivots) as there are panels. In FIGURE 4, and its attendant sectional FIGURES 5–13, to simplify illustration it is assumed that there are four (4) panels, and hence the construction of all fixtures on Track 10 are arranged for that many, thus the base 40 (FIGURES 4 and 5) is shaped as an octagon, thus providing four (4) "flats" equally spaced radially for mounting the pivot brackets 41, 42, 43, and 44. These brackets 41–44, corresponding to the four (4) panels IA, IIA, IIIA, and IVA. If n panels are used, the hub 40 would be provided with n panel brackets all as shown at 41–44.

Each of the panel brackets 41–44 is attached by suitable screws to the hub 40, and they—in turn—serve to support, at the bottom of the machine, outwardly extending panel frame rods 45–1, 45–2, 45–3 and 45–4. These rods are in plane L1 of each panel and are mounting rods extending out a little beyond the circle 31 (FIGURE 1) of location of the Constraint and Extremum Tracks. At the bottom of each of these tracks, there is a connecting block such as the block 48 at the bottom of Constraint Track 1. It is preferred that the block 48 should be mounted upon a common base B1 which also serves as a mounting for the block 40 and the Main Track 10. The block 48 is bored to receive the rod 45–1.

Similarly at the top of the machine there is a central mounting block 49 for the track 10, this being identical with 40, and from this block 40 the upper panel frame rods, such as rod 50–1, extends outwardly and are supported as at the attachment block 51. It is preferred that the blocks 49 and 51 likewise be attached to a common frame F of convenient size which is solid in respect to the base B1. The two panel frame rods 45–1 and 50–1 for the panel IA are in the same vertical plane, this being plane L1 for panel IA. For each of the other panels there is a pair of such rods, one at the bottom and one at the top and—in every instance—these rods serve not only as framework rods, but also as a guide rail on which the proportionality tracks of the panel may be mounted for adjustable translatory movement radially toward and away from track 10. Thus, on the rod 45–1 of panel IA, there are a plurality of blocks 52, 53, and 54, each provided with a set screw so that its position can be adjusted along the rods 45–1. Similarly, at the top of the machine, on the rod 50–1 there are blocks 55, 56, and 57, and these also are provided with set screws so that their positions may be adjusted. The blocks 52 through 57 are made sufficiently sturdy so that when the set screws in the corresponding top and bottom blocks are loosened, the proportionality rod which is supported by an upper and lower pair of blocks will not be permitted to cock sideways. Thus, upon the blocks 52 and 55 there is supported a proportionality rod P11. It will be noted that the vertical plane of location of rod 45–1 at the bottom and rod 50–1 at the top is the rearmost plane L1. The blocks 52–57 extend forwardly in FIGURE 4 (downwardly in FIGURE 5), from these rods and hence locate the rod P11 in the next plane of location which is plane L2. Similarly, the blocks 53 at the bottom and 56 at the top serve as a mounting for the proportionality rod P12 and block 54 at the bottom and 57 at the top serve as a mounting for the proportionality rod P13.

The plane of location of proportionality rods P11, P12 and P13 may also conveniently be the plane of location in which there is positioned the Constraint Track of the panel, which for panel IA is Constraint Track 1, this being location plane L2. Accordingly, for convenience in manufacture the blocks 48 at the bottom and 51 at the top for locating the Constraint Track 1, and the blocks 52–57 may all be of the same pattern and provided with set screws where they are to be adjustable, as for blocks 52–57. The blocks 48 and 51 can be pinned in place or otherwise immovably fastened.

The next plane of location, in a forward direction from the plane of location of the proportionality rods and Constraint Track, is that plane L3 containing the "downwardly extending" (or proximally extending) rods, which in FIGURE 4 are the rods 27, 29 and 31. The term "downwardly extending" is by reference to the pivotal connection of each rod on its fixture on the Main Track 10. Thus, rod 27 extends "downwardly" from pivot 75 of fixture S2 on Track 10. Forwardly of this plane L3 is the forntal plane of location L4, which contains the "upwardly extending" (or distally extending) rods, which in FIGURE 4 are rods 26, 28 and 30. Here again the term "upwardly" is with reference to the pivot of each rod on its fixture on Track 10. FIGURES 5–12, these locating planes are designated from the rear to the front as L1 through L4.

The form of fixture used at position T, S2, S1 and M, on the Main Track is illustrated in FIGURES 6, 8, 10, and 12. These fixtures can all be identical, except that for the fixtures T and M, set screws are provided. It may be reiterated that for purposes of nomenclautre fixture T is designated the proximal fixture on the main track; fixture M is the distal fixture; and fixtures S1 and S2 are designated "intermediate" fixtures. The ends of the machine are correspondingly designated.

Fixture T is permanently fixed with respect to the Track 10 and fixture M is made so that its position can be adjusted according to the problem. The fixtures S1 and S2 are freely slidable (up and down) on the Track 10. Since these fixtures are all therefore basically the same, only one must be described in detail.

Thus, referring to FIGURE 6, the fixture T has an octagonal hub shape 60, similar to the hub of base fixture 40. For each of the panels IA–IVA, there is an outstanding lug as at 61—64 and these lugs are drilled so that pivot pins, such as pivot pin 65 in the lug 63, can be inserted. Since Fixture T is to be fixed immovably on the rod 10, it is provided with a set screw 67, whereas fixture S2, is slidable and does not have such a set screw, not does the fixture S1, but otherwise both are the same as the Fixture T. The fixture M is provided with a set screw 68, and this is conveniently made with a knurled head (see FIGURE 12), so as to permit the user to easily adjust and lock the position of the fixture M on the rod 10.

For the fixture S2, in FIGURE 8 (see FIGURE 8) there are likewise four (4) protruding ears 71, 72, 73 and 74, and these are each provided with a pivot pin corresponding to the pivot 75 in the lug 73. It is the pivot 75 which serves as a pivotal mounting for the rods 27 and 28 (see FIGURES 4 and 8). With reference to these figures, it may be noted that the rod 28, which slants upwardly, is in locating plane L4 whereas the rod 27 which slants downwardly is in locating plane L3. The lug 81 on fixture S1 (see FIGURE 10) is the one to which there is also pivotally attached the rods 23 and 24 of Panel IIIA. The rod 24 extends upwardly whereas the rod 23 extends downwardly. Note that the locating planes L3 and L4 for panel IIIA have their positions reversed, as compared to panel IA because on the right side of the Main Track 10, panel IIIA is "seen from the rear" as compared to panel IA.

The slider S1 is similar to the slider S2. It has the lugs 81, 82, 83 and 84, the lug 83 being provided with pivot 85 upon which the downwardly slanting rod 29 in locating planes L3 is attached and upon which the upwardly slanting rod 30 in the locating plane L4 is likewise pivotally attached. The lug 31 (for panel IIIA) is provided with a pivot 86 upon which the downwardy extending rod 23 in locating plane L4 and the upwardly slanting rod 24 in the locating plane L3 are pivotally attached, these rods being in the panel IIIA.

Referring to FIGURE 12, there is illustrated the fixture M, previously referred to. This fixture is entirely similar to the sliders S1 and S2, and has a lug 91—94 protruding therefrom. The lug 93 serves as a mounting for the pivot 95 upon which there is pivotally attached a rod 31 in locating plane L3, this rod extending downwardly from pivot 95. Similarly, the lug 91 serves as a mounting for the pivot 96 from which the rod 25 of panel IIIA extends downwardly. There is only one rod for each panel pivotally attached to fixture M. Fixture M has a set screw 68 with a knurled head. When 68 is loose, fixture M slides freely; when tight, fixture M is held fast on Track 10.

The sliders G1–G3, G11–G13, S3–S8, and T1 and E, see FIGURE 1, should be constructed according to the design shown in FIGURES 15 and 16.

As previously noted, sliders G1, G11, E and T1 are "proximal" in location; sliders G3, G13, S6 and S3 are "distal" in location, and G2, G12, S4, S5, S7 and S8 are "intermediate" in location. Generally, the end of the machine at which fixtures and sliders T1, T and E are located is called the proximal end, the opposite end is called the distal end.

These sliders can be constructed according to FIGURES 15 and 16 where the slider as a whole is generally designated 100. Each slider is composed of three blocks shown opposite the brackets 101, 102 and 103 in FIGURE 16. Each block is composed of two halves, for convenience of manufacture. Thus, the block 101 is composed of the portions 101a and 101b. The block 102 is composed of the portions 102a and 102b, and the block 103 is composed of the portions 103a and 103b. The "block-halves" are fastened together in each instance by a pair or two pairs of screws, as for example, the screws 104—104 for the block 100, the screws 105—105 for the block 102, and the screws 106—106 for the block 103. In each instance, the screws thread into the portion of the block bearing the numeral "a," as for example, into portion 101a, and the heads of the screws are recessed into the portion of the block bearing the numeral "b," thus noting that the heads of screws 104 are recessed into the portion 101b of its block, the others being similar. Each block is provided with a drill hole that is smoothly reamed out to receive the rod (which are rods 20–31), the block 101 being provided with a hole 107, the block 102 being provided with a hole 108 and the block 103 being provided with a hole 109. For convenience in manufacture these are all reamed to uniform diameter. Also, for convenience in manufacture, all the proportionality tracks P1—P3 and P11—P13 are made of the same diameters as the rods 21 through 31.

The three blocks 101, 102, and 103 are fastened together so that they can rotate on an axis 110—110 which is perpendicular to the locating planes L2, L3 and L4 in which the axes of the reamed holes 107, 108 and 109 are respectively located. These bore holes have their axes located in the same locating planes L2, L3, and L4, previously referred to and one of the blocks 101 (or 103) slides upon the proportionality rod, the middle block 102 thereupon receives all the rods in the next adjacent locating plane L3 and the blocks at the opposite end, which is block 103 (or 101) then receives all rods in the locating plane L4. Since the assembly shown in FIGURE 16 is symmetrical into the end (except for the direction in which the clamping screws 104—106 are directed) the assembly may be used in either way. For purposes of explanation, it will be assumed that the block 101 receives the proportionality rod, hence is in plane L2, that block 102 receives all rods in plane L3 and that block 103 receives all rods in plane L4.

The mode of attaching the several blocks together for pivotal movement on the axis 110—110 is the underlying reason why the block is split at the locating planes. This is for machining purposes. Thus, the block portion 101b, when detached from the portion 101a has its surface coinciding with the locating plane L2 exposed and may therefore conveniently be provided with a hole of diameter 111. This hole is bored out to provide a flat shoulder at 112 and a hole of smaller diameter 113 is then continued through to the outer surface of the block portion 101b. The block portion 102a is similarly bored, as are all other block portions in the assembly except portions 101a and 103b. Then, with units disassembled, there is inserted into portion 101b a small headed rivil 114 having reduced end portions 115 and collar 117 is seated on the reduced end 115 and flush riveted. The length of the shaft of rivil 114 is such that a smooth rotating fit between the mating surfaces of the portions 102a and 101b will be provided. An entirely similar attachment is provided at 120 between the block portions 102b and 103a. The blocks 101, 102 and 103 are longer than they are wide and hence by rotating them the heads of screws 104 can be exposed for placing them, block portion 101b is then attached to portion 101a by its attaching screws 104. The rivil 120 is then placed to attach 102.

The entire assembly shown in FIGURE 16 is then used wherever a slider G1, G2, G3, G11, G12, G13, T1, E or S3 through S8 is indicated. In some instances, as where rod 30 passes through the slider S3, the middle block 102 is not occupied by a slider rod, and it then acts merely as a spacer. This is also true in respect to the slider T1 where the outer block 103 is not used. In such instances the outer block may be omitted for that slider, but for manufacturing convenience it is usually included. It is only in the instance of the rods passing through the sliders T1 and S3 that all blocks are not utilized. A similar situation prevails in respect to the sliders E and S6 of the unit IIIA, and similarly for other panels. In general it may be noted that where there are "K" intermediate fixtures on the main track (which, with the proximal and distal fixtures makes a total of K plus 2), there will then be used K plus 1 proportionality tracks. Also, there will then be K intermediate sliders on the Constraint or Extremum Tracks.

The mathematical principles underlying the operation of the machine may be understood by reference to FIGURES 1, 2 and 3. The slider fixtures S1, S2, and M ride freely along the Main Track 10; only Fixture T being fixed. In some problems, fixture M may be fixed or held against movement beyond a certain point (in either direction) on Track 10. From the pivots located at the point M, S1, S2 and T on the main track 10, there emanate the rigid rods 26, 27, 28, 29, 30, and 31, for the panel 1A, and as indicated in FIGURE 2, these rods pass through the sliders G11, G12, and G13 on the proportionality tracks. The proportionality tracks are parallel to the Main Track 10 and to the Constraint Track 1, but their position radially with reference to the main track may be adjusted in accordance with any problem. After passing through the sliders G11, G12, and G13, the rods then continue until they pass through the sliders S5, S4, S3 and T1 respectively on the Constraint Track 1. The Constraint Track is also fixed in the machine and is parallel to the Main Track 10. After passing through these sliders, the rods extend somewhat beyond the Constraint Track 1, so as to provide sufficient length to accommodate a variety of motions without dropping the rod from any of the sliders S3, S4, or S5, or the slider T1. The slider at T1 of Constraint Track 1 is fixed so that it does not move with reference to the track although it does permit the rod 27 through it to slide freely without binding. On Constraint Track 1 there may be placed a stop H1 or H2 which can be adjustably positioned on the Constraint Track 1 (according to FIGURE 14) either above or below the slider S3. This stop H is made like a small U as shown in FIGURE 14 and is provided with a set screw 111 by means of which it may be clamped onto the Constraint Track 1 in any selected elevation.

In summary, one may say therefore that any of the rods 26—31 pass either:

(a) Between a fixed position (e.g. stop M); through a slide (e.g. such as slide G13) and a slide on the Constraint Track (e.g. slide S4), or (b) Between a slider on the Main Track 10 (e.g. slider S1), through the slider (e.g. slider G12) and a slider on the Constraint Track 1 (e.g. slider S5). Each rod 26—31 is pivoted at its point of termination on the Main Track. This is true whether the rod terminates at one of the fixed elements T or M, or whether it terminates on one of the sliders S1 or S2.

The elementary geometry of similar triangles shows that in FIGURE 2 the following relations and their corollaries obtain:

$$\frac{\overline{S_1S_2}}{\overline{S_5S_4}} = \frac{a_0-a_{12}}{a_{12}}$$

or $$\overline{S_5S_4} = \frac{a_{12}}{a_0-a_{12}}(\overline{S_1S_2}) = A_{12}(\overline{S_1S_2})$$

where $$A_{12} = \frac{a_{12}}{a_0-a_{12}}$$

Hence, if $x_1$, $x_2$, $x_3$ denote the distances $\overline{TS_2}$, $\overline{S_2S_1}$ and $\overline{S_1M}$ as in FIGURE 2, then, the distance $\overline{T_1S_3}$ on the Constraint Track 1 can be written in the form:

$$T_1S_3 = A_{11}x_1 + A_{12}x_2 + A_{13}x_3 = \sum_{j=1}^{3}A_{1j}x_j$$

where $$A_{11} = \frac{a_{11}}{a_0-a_{11}}; \quad A_{12} = \frac{a_{12}}{a_0-a_{12}}; \quad A_{13} = \frac{a_{13}}{a_0-a_{13}}$$

Therefore if the stop H is used in position H1, as indicated in FIGURE 2, between S3 and the end of Constraint Track 1, the Constraint $$\sum_{j=1}^{3}A_{1j}x_j \leq \overline{T_1H} = B_1$$

will be obeyed automatically for any configuration which the mechanical system may assume.

On the other hand, if stop H is placed in position H2 in FIGURE 2, between S3 and S4, then the Constraint $$\sum_{j=1}^{3}A_{1j}x_j \geq \overline{T_1H} = B_1$$

will be obeyed automatically for any configuration which the mechanical system may assume.

Now, referring to FIGURE 3, it will be noted that this differs from FIGURE 2 in the inclusion of a new track, namely the Extremum Track 3. This new track is associated with the Main Track 10 in a manner similar to that in which the Constraint Track 1 is associated with the Main Track 10, as previously explained. For example, there are three proportionality tracks, P1, P2 and P3 (like P11, P12 and P13). In addition there are sliders G1, G2 and G3 on the proportionality tracks (like G11, G12 and G13). There are sliders on the Extremum Track 3, these being the sliders S6, S7 and S8, and slider E. The rods 20—25 which extend from the main track through the sliders G1, G2, and G3 and through the sliders S6, S7, S8 and E operate in the same way as do the rods 26—31 from the main track to the Constraint Track 1. There is one important distinction between the situation which is found on the Extremum Track 3 and the situation which is found on the Constraint Track 1. For whereas on the Constraint Track 1 there is a stop H, which may be positioned either above (position H1) or below (position H2) the slider S3 on the Constraint Track 1, on the Extremum Track 3 there is no corresponding stop.

Since $$\frac{\overline{S_6S_7}}{\overline{MS_1}} = \frac{a_3}{a_0-a_3}$$

then, just as in the previous situation, we see $$\overline{S_6S_7} = \frac{a_3}{a_0-a_3}(\overline{MS_1}) = D_3(\overline{MS_1}) = D_3x_3$$

where $$D_3 = \frac{a_3}{a_0-a_3}$$

From this, it follows that the distance $ES_6$ on the Extremum Track can be expressed by the formula:

$$\overline{ES_6} = D_1x_1 + D_2x_2 + D_3x_3 = \sum_{j=1}^{3}D_jx_j$$

where $$D_1 = \frac{a_1}{a_0-a_1}; \quad D_2 = \frac{a_2}{a_0-a_2}; \quad D_3 = \frac{a_3}{a_0-a_3}$$

Suppose for the sake of ultimate simplicity and concreteness, we are faced with the following problem:

Minimize the sum $$\sum_{j=1}^{3}D_jx_j$$

where $D_1$, $D_2$, $D_3$ are given and the minimizing $x$'s must be found, subject to the constraint $$\sum_{j=1}^{3}A_{1j}x_j \leq B_1$$

where the numbers $A_{11}$, $A_{12}$, $A_{13}$ and $B_1$ have been given.

To solve this problem, the machine, as schematized in FIGURE 3 would be set up as follows: The distances $a_{11}$, $a_{12}$, $a_{13}$, and the distances $a_1$, $a_2$, $a_3$ would be adjusted in accordance with the formulae which follow:

$$a_{11}=a_0 \cdot \frac{A_{11}}{1+A_{11}};\ a_{12}=a_0 \cdot \frac{A_{12}}{1+A_{12}};\ a_{13}=a_0 \cdot \frac{A_{13}}{1+A_{12}};$$

and $$a_1=a_0 \cdot \frac{D_1}{1+D_1};\ a_2=a_0 \cdot \frac{D_2}{1+D_2};\ a_3=a_0 \cdot \frac{D_3}{1+D_3}$$

That is to say, the positions of the proportionality tracks P1, P2, and P3, and P11, P12 and P13 would be adjusted so that these distances would be realized.

The Stop H on the Constraint Track 1 is placed at $H_1$ between slide S3 and the point C1. The position of the stop H is set to make the distance $\overline{T_1H}$ equal to $B_1$. With the machine set up as so described, the slide S6 would then be moved in the direction of E as far as the slide S6 could be moved in that direction. The configuration of the machine at which all the rods and slides would bind would then be a configuration which would minimize the distance, $ES_6$, that is to say, which would minimize the sum $$\sum_{j=1}^{3} D_j x_j$$

subject to the constraint that the distance $\overline{T_1S_3}$ be not more than the distance $\overline{T_1H}$. Algebraically stated, this constraint is expressed by the inequality $$\sum_{j=1}^{3} A_{1j}x_j \leq B_1$$

To illustrate the use of the machine on a more realistic problem, let us consider the following:

Suppose that one has three different flours which are to be blended into a new flour. Suppose that the protein percentages in these three flours are A11, A12, A13. Suppose that the moisture percentages in these three flours are A21, A22, A23. Suppose that the unit costs of these flours are D1, D2, D3, and finally, suppose that the object of the investigation is to choose that blend of these three flours which will have a protein content at least as great as B1 and a moisture content not more than B2.

The mechanism which would be used to solve this problem is a machine such as described and which is schematized in FIGURE 1 in which there would appear two Constraint Tracks. Constraint Track 1 and Constraint Track 2. one Extremum Track 3, and—of course—the Main Track 10. In this problem, the Constraint Track 4 is removed from operation as are all other tracks "n." In such machine, there are three (3) sets of proportionality tracks, one set for each of the two Constraint Tracks 1 and 2 and one set for the Extremum Track 3. There are also three (3) sets of sliders for the three (3) sets of proportionality tracks. There are also two (2) stops, one on each of the two (2) Constraint Tracks 1 and 2. The precise location of these stops will be described as the discussion of the problem proceeds. The mathematical formulation of the problem would read as follows:

Find $x_1$, $x_2$, $x_3$ so that $$A_{11}x_1 + A_{12}x_2 + A_{13}x_3 \geq B_1$$

and $$A_{21}x_1 + A_{22}x_2 + A_{23}x_3 \leq B_2$$

and so that $$D_1x_1 + D_2x_2 + D_3x_3$$

is minimized.

The proportionality tracks associated with the Constraint Track 1 would have their distances from that first Constraint Track adjusted so that numbers $A_{11}$, $A_{12}$, $A_{13}$ would be realized mechanically. The proportionality tracks associated with Constraint Track 2 would be adjusted similarly so as to permit the realization of the numbers $A_{21}$, $A_{22}$, $A_{23}$. On Constraint Track 1, the stop H is placed in the dotted line position between slider S3 and slider S4. On Constraint Track 2, which appears in minimum representation, a stop H would be placed in a position above the uppermost slider on Constraint Track 2. The precise location of the stop H (position $H_1$) on Constraint Track 1 would be such as to make the distance $\overline{T_1H}$ equal to $B_1$. The precise location of the stop H (position $H_2$) on Constraint Track 2 would be such as to make its distance from the bottom of Constraint Track 2 (that is, the point 2′) to the stop H2–2 equal to $B_2$ (in other words, $\overline{2'H}=B_2$). The proportionality tracks associated with Extremum Track 3 would have their distances from the Extremum Track adjusted so that the numbers $D_1$, $D_2$, and $D_3$ would be realized mechanically. Then, with the proportionality tracks for the two Constraint Tracks 1 and 2 and the Extremum Track, $E_1E$, properly adjusted and with the stops $H_1$ and $H_2$ properly located, the top slider of the configuration on Extremum Track 3 (that is, to say, the top slider $S_6$) would be forced as close as possible to the bottom of the Extremum Track, that is, the point E. Thereby, the distance $\overline{ES_6}$ would be minimized. Since, however, the distance $\overline{ES_6}$ is the sum $$\sum_{j=1}^{3} D_j x_j$$

we, in effect, minimize the total cost of producing the flour. On the other hand, since the stops located on Constraint Track 1 and Constraint Track 2 would enforce the satisfaction of the inequalities $$\sum_{j=1}^{3} A_{1j}x_j \geq B_1$$

and $$\sum_{j=1}^{3} A_{2j}x_j \leq B_2$$

we discover that, in effect, we would have minimized the cost while producing a flour whose minimum requirements are expressed by the inequalities above. On the Main Track 10, the positions of slides $S_1$ and $S_2$ and the corresponding distances $x_1$, $x_2$, $x_3$ would provide the proportions in which the three available flours should be blended to make this optimal flour.

Quite clearly, examples of this nature can be multiplied arbitrarily. The number of available flours from which a final flour can be blended need not be the number three. The number of restrictions imposed upon the final flour need not be two. The quantity to be extremalized need not be a cost which is to be minimized, but could well be a nutritive quantity which has to be maximized. We need not limit ourselves to the blending of flour which is used herein only for purposes of illustration. The useful applications of the invention are essentially unlimited. For example, one may mention the blending of gasolines, or ores, of feeds, traffic allocations, etc.

One may summarize the situation as follows: If a sum such as given at the beginning of this specification is to be extremalized, and if the variables are restricted as indicated by the inequalities associated with that sum, then one provides a machine for which there are $m$ constraint tracks, one main track, and one extremum track. On each of the tracks, the number of sliders to be found will be such as to provide a correspondence with the number of $x$'s (or unknowns or variables) which appear in the problem. For example, if the problem involves three $x$'s, then one provides that on the Main Track there are two intermediate sliders (corresponding to S1 and S2 in FIGURE 1) and on each of the other tracks there are three (3) moving sliders and one (1) fixed slider. In general, if the problem involves $n$ $x$'s, then on the Main Track there will be $n-1$ sliders and on each of the other tracks there will be $n$ moving sliders and one fixed slider. It should be noted, however, that on any one proportionality track there is precisely one slider, no matter how many variables and no matter how many constraints are involved. Associated with each Constraint Track and with the Extremum Track there are as many proportionality tracks as there are unknowns or variables in the problem. Namely, there are $n$ proportionality tracks associated with each Constraint Track and $n$ proportionality tracks associated with the Extremum Track if there are $n$ variables or unknowns in the problem.

It is to be observed that the schematic representation of the machine as given in FIGURE 1 is only one of many possible representatives. That is to say, there are several mechanical realizations of the principle which is embodied in the machine shown in FIGURES 1–16.

In FIGURES 17 and 18 there is illustrated another form of the invention in which each of the panels or units IA, IIA, IIIA, IVA, and $n$A is rearranged by rotating them so as to bring these units, each of which is of essentially planar configuration, into complete parallelism. Stated another way, it may be considered that instead of the units IA–IVA and $n$A being fanned out around a central post 10, at the Main Track, these units are arranged parallel to each other, stacked one over the other in moderately spaced relation. This arrangement is shown in isometric view in FIGURE 17 where the unit IIIA (constituting the Extremum Track 3) is arranged as the top layer and the unit IA is arranged as the bottom layer. The other units IIA, IVA, and $n$A are arranged as intermediate layers. To achieve this arrangement, each panel IA, IIA, IIIA, $n$A and IVA is considered as a separate unit, which in fact it is, being connected only by pivots to the fixtures AT, AS2, AS1 and AM. In FIGURE 17 there are four corner supports 140, 148, 149 and 151. Supports 140–149 serve the same purpose as lower and upper brackets 40 and 49 of FIGURE 4, namely to locate Main Track 10, but in FIGURE 17, the Main Track is composed of two parallel rods 10A and 10B. On these tracks 10A and 10B there is a fixed fixture AT corresponding to fixture T of FIGURES 1–3, on tracks 10A and 10B there are arranged to slide the fixtures AS1 and AS2 and AM which correspond respectively to fixtures S1, S2 and M of FIGURES 1–3.

Each of these fixtures has spaced lugs on it extending horizontally at as many levels as there are panels IA, IIA, IIIA, and $n$A in the device. These are shown in the representative section FIGURE 18. Fixture AT is fixed against movement on rods 10A and 10B, the fixtures AS1, AS2 and AM (corresponding to S1, S2 and M of FIGURE 4) are free to slide back and forth within the limits imposed by the movements of the rods of each panel (IA, IIA, IIIA, IVA and $n$A) relative the slides on their respective constraint tracks and as determined by the setting on the proportionality tracks of said panels and subject to fixture AM being optionally set in a fixed position, if desired. Otherwise, the operation of the modification shown in FIGURES 17 and 18 is exactly the same as that shown in FIGURES 1–16.

The system uses a selected number, i.e., "K" fixtures S1 and S2 in addition to the proximal and distal fixtures T and M respectively on such tracks, and there will be K plus 1 proportionality tracks in the system. Thus in FIGURES 1, 2, 3 and 4, "K" is the constant "2."

What I claim is:

1. A mechanical analogue computer panel comprising a frame having proximal and distal ends, having thereon in succession, a main track, K plus one proportionality track and a constraint track, where K is a desired number, all of said tracks being parallel in spaced side-by-side relation and extending from the proximal end to the distal end of the frame, at least said proportionality and constraint tracks being in substantially the same plane, said main and constraint tracks being mounted on the frame in fixed positions and said proportionality tracks being mounted on the frame so as to be adjustably held in spaced parallel positions between the main and constraint tracks; proximal, K intermediate and distal fixtures on the main track, all except the proximal fixture being slidable along said main track; a slider on each proportionality track; proximal, K intermediate and distal sliders on the constraint track; a first set of rods pivotally connected to the proximal and intermediate fixtures on the main track, each rod extending outwardly and angularly toward the distal end of the frame and so as to cross the proportionality tracks and cross and extend beyond the constraint track; a second set of rods pivoted to the distal and intermediate fixtures on the main track, each rod extending outwardly and angularly toward the proximal end of the frame and so as to cross the proportionality tracks, and cross and extend beyond the constraint track, the rods of the two sets being, respectively, in closely spaced parallel planes, the said rods in pairs composed of one rod from each set intersecting a common crossing point on one only of each of the proportionality tracks, the sliders on the proportionality tracks being formed slidably to receive each rod at said common crossing point; the sliders on the constraint tracks being formed slidably to receive the rods where they cross the constraint track, said pairs of rods being stacked so that one rod of each pair coupled by a slider on a proportionality track crosses and is coupled to a rod of an adjacent pair where it crosses the constraint track.

2. The mechanical analogue computer specified in claim 1 further characterized in that a stop is provided on the constraint track in the path of movement of the distal slider thereon.

3. The mechanical analogue computer specified in claim 1 further characterized in that means is provided for adjustably positioning the proportionality tracks at selected positions between the main and constraint tracks.

4. A mechanical analogue computer comprising a common frame having proximal and distal ends; a common main track on said frame; a plurality of panels on said frame each composed of said common main track and K plus one separate proportionality tracks and a separate constraint track, where K is a desired number, the constraint track of one panel being denoted the extremum track for the computer; the common main track and the proportionality tracks and constraint track of each panel being parallel and in spaced side-by-side relation and extending from the proximal end to the distal end of the common frame, at least said proportionality and constraint tracks being in substantially the same plane, said main and constraint tracks of each panel being mounted in fixed positions relative to each other and said proportionality tracks being mounted on each panel so as to be adjustably held in spaced parallel positions between the main and constraint tracks of such panel; proximal, K intermediate and distal fixtures on the main track, all except the proximal fixture being slidable along said main track; each panel being characterized in that on each there is provided a slider on each proportionality track; proximal, K intermediate and distal sliders on the constraint track; a first set of rods pivotally connected to the proximal and intermediate fixtures on the main track, each rod of the first set extending outwardly and angularly toward the distal end of the common frame and so as to cross the proportionality tracks and cross and extend beyond the constraint track of such panel; and a second set of rods pivoted to the distal and intermediate fixtures on the main track each rod of the second set extending outwardly and angularly toward the proximal end of the frame and so as to cross the proportionality track and cross and extend beyond the constraint track of such panel the rods of the first and second sets being, respectively, in closely spaced parallel planes; the said rods in pairs composed of one rod from each set intersecting a common crossing point on one only of each of the proportionality tracks; the sliders on the proportionality tracks being formed slidably to receive each rod at said common crossing point; the sliders on the constraint tracks being formed slidably to receive the rods where they cross the constraint tracks said pairs of rods being stacked so that one rod of each pair coupled by a slider on a proportionality track crosses and is coupled to a rod of an adjacent pair where it crosses the constraint track of said panel.

5. The mechanical analogue computer specified in claim 4 further characterized in that means is provided on the common frame for adjustably positioning the proportionality tracks of each panel at selected spacings relative the common main track.

6. The mechanical analogue computer specified in claim 4 further characterized in that the panels are situated in planes angularly disposed relative each other and extending radially outward from said common main track.

7. The mechanical analogue computer specified in claim 4 further characterized in that the panels are situated in parallel stacked relationship and with the common main track along the contiguous edges of the stacked panels.

8. The mechanical analogue computer specified in claim 4 further characterized in that stops are provided on selected constraint tracks for limiting the movement of the distal sliders on said tracks.

9. The mechanical analogue computer specified in claim 4 further characterized in that restrictions are provided on the movement of selected sliders on selected tracks for limiting the movement of the sliders.

References Cited in the file of this patent

UNITED STATES PATENTS

| | | |
|---|---|---|
| 2,210,938 | Garrett | Aug. 13, 1940 |
| 2,671,609 | Davidson | Mar. 9, 1954 |
| 2,868,448 | Walker | Jan. 13, 1959 |

FOREIGN PATENTS

| | | |
|---|---|---|
| 415,286 | Germany | June 17, 1925 |
| 820,818 | Germany | Dec. 13, 1951 |

UNITED STATES PATENT OFFICE
CERTIFICATE OF CORRECTION

Patent No. 3,018,950                  January 30, 1962

L. R. Verschoyle

It is hereby certified that error appears in the above numbered patent requiring correction and that the said Letters Patent should read as corrected below.

Column 6, line 48, for "forntal" read -- frontal --; column 7, line 3, for "not" read -- nor --; column 11, lines 3 to 5, for the right-hand portion of the formula reading $\dfrac{A_{13}}{1+A_{12}}$ read $\dfrac{A_{13}}{1+A_{13}}$ Signed and sealed this 5th day of June 1962.

(SEAL)
Attest:

ERNEST W. SWIDER
Attesting Officer

DAVID L. LADD
Commissioner of Patents